(12) United States Patent
Kanda et al.

(10) Patent No.: US 10,014,746 B2
(45) Date of Patent: Jul. 3, 2018

(54) ROTARY ELECTRIC MACHINE AND METHOD OF MANUFACTURING ROTARY ELECTRIC MACHINE

(71) Applicant: ASMO CO., LTD., Kosai, Shizuoka-pref. (JP)

(72) Inventors: Hidenori Kanda, Toyohashi (JP); Shigeaki Kageme, Toyohashi (JP); Takahiro Nakayama, Hamamatsu (JP); Yoshiyuki Takabe, Hamamatsu (JP)

(73) Assignee: ASMO CO., LTD., Kosai (JP)

( * ) Notice: Subject to any disclaimer, the term of this patent is extended or adjusted under 35 U.S.C. 154(b) by 0 days.

(21) Appl. No.: 15/666,667

(22) Filed: Aug. 2, 2017

(65) Prior Publication Data

US 2017/0331347 A1 Nov. 16, 2017

Related U.S. Application Data

(62) Division of application No. 14/224,077, filed on Mar. 25, 2014, now Pat. No. 9,762,102.

(30) Foreign Application Priority Data

| Apr. 2, 2013 | (JP) | ................................. | 2013-077060 |
| Jul. 17, 2013 | (JP) | ................................. | 2013-148694 |
| Jan. 10, 2014 | (JP) | ................................. | 2014-003451 |

(51) Int. Cl.
*H02K 5/22* (2006.01)
*H02K 3/52* (2006.01)
(Continued)

(52) U.S. Cl.
CPC ............ *H02K 5/225* (2013.01); *H02K 3/522* (2013.01); *H02K 11/33* (2016.01); *H02K 15/14* (2013.01);
(Continued)

(58) Field of Classification Search
CPC ........ H02K 5/225; H02K 15/14; H02K 11/33; H02K 3/522
(Continued)

(56) References Cited

U.S. PATENT DOCUMENTS

| 5,021,926 A | * | 6/1991 | Azpeitia Urrestarazu .......... H01L 25/072 257/E25.016 |
| 2009/0058211 A1 | | 3/2009 | Oowatari et al. |

(Continued)

FOREIGN PATENT DOCUMENTS

| CN | 101383533 A | 3/2009 |
| CN | 101404427 A | 4/2009 |

(Continued)

OTHER PUBLICATIONS

Non-Final Office Action issued in co-pending U.S. Appl. No. 14/224,077 dated Dec. 21, 2016.
(Continued)

*Primary Examiner* — Naishadh Desai
(74) *Attorney, Agent, or Firm* — SOLARIS Intellectual Property Group, PLLC

(57) ABSTRACT

In a rotary electric machine, wound wires are connected to a first terminal and a second terminal. Circuit terminals that are configured from a conductive metal other than aluminum, and the first terminal and the second terminal that are configured from a metal with a principal component of aluminum are joined together inside a circuit chamber that has high water resistant properties. Corrosion is accordingly suppressed at join sites of the circuit terminals with the first terminal and the second terminal. There is therefore no need to coat the join sites with for example a sealing material in order to suppress corrosion at the join sites. Good electrical continuity is accordingly enabled between the circuit terminals and the wound wires while suppressing an increase in
(Continued)

costs, even when the wound wire is configured from a metal with a principal component of aluminum.

6 Claims, 11 Drawing Sheets

(51) Int. Cl.
*H02K 11/33* (2016.01)
*H02K 15/14* (2006.01)
*H02K 3/02* (2006.01)
*H02K 3/44* (2006.01)
*H02K 5/08* (2006.01)

(52) U.S. Cl.
CPC ................. *H02K 3/02* (2013.01); *H02K 3/44* (2013.01); *H02K 5/08* (2013.01); *Y10T 29/49009* (2015.01)

(58) Field of Classification Search
USPC .......................................................... 310/71
See application file for complete search history.

(56) References Cited

U.S. PATENT DOCUMENTS

| | | |
|---|---|---|
| 2009/0189475 A1 | 7/2009 | Shin |
| 2010/0090548 A1 | 4/2010 | Huashan et al. |
| 2010/0199725 A1 | 8/2010 | Lee et al. |
| 2010/0295394 A1* | 11/2010 | Sahara .................... H02K 3/522 310/71 |
| 2010/0329907 A1 | 12/2010 | Jung et al. |
| 2011/0037331 A1 | 2/2011 | Jang et al. |
| 2011/0062808 A1 | 3/2011 | Shin et al. |
| 2011/0316365 A1 | 12/2011 | Kim |
| 2012/0126646 A1 | 5/2012 | Nakagawa et al. |
| 2013/0001763 A1* | 1/2013 | Stella .................. H01L 23/4334 257/690 |
| 2013/0033352 A1 | 2/2013 | Wo |
| 2013/0121815 A1* | 5/2013 | Tsuboi .................... F04C 18/16 415/191 |
| 2013/0234548 A1* | 9/2013 | Oishi ...................... H02K 5/225 310/71 |
| 2013/0249335 A1 | 9/2013 | Motoda |
| 2014/0091683 A1 | 4/2014 | Ito et al. |

FOREIGN PATENT DOCUMENTS

| | | | |
|---|---|---|---|
| CN | 101888150 A | 11/2010 | |
| CN | 101895185 A | 11/2010 | |
| JP | 62217875 A * | 9/1987 | ........... H02N 2/0045 |
| JP | 02266880 A * | 10/1990 | |
| JP | 2004-111058 A | 4/2004 | |
| JP | 2007-089259 A | 4/2007 | |
| JP | 2008-172861 A | 7/2008 | |
| JP | 2009206002 A * | 9/2009 | |
| JP | 2010-130831 A | 6/2010 | |
| JP | 2010-273450 A | 12/2010 | |
| JP | 2011-34879 A | 2/2011 | |
| JP | 2011-229227 A | 11/2011 | |
| JP | 2012-222963 A | 11/2012 | |
| JP | 2013-20983 A | 1/2013 | |
| WO | 2013/157043 A1 | 10/2013 | |

OTHER PUBLICATIONS

English language translation of the following: Office action dated May 11, 2017 from the SIPO in a Chinese patent application No. 201410120589.9 corresponding to the instant patent application. This office action translation is submitted now in order to supplement the understanding of the cited reference which is being disclosed in the instant Information Disclosure Statement.

English language translation of the following: Office action dated Sep. 26, 2017 from the JPO in a Japanese patent application No. 2014-003451 corresponding to the instant patent application. This office action translation is submitted now in order to supplement the understanding of the cited reference which is being disclosed in the instant Information Disclosure Statement.

English language translation of the following: Office action dated Jan. 17, 2018 from the SIPO in a Chinese patent application No. 201410120589.9 corresponding to the instant patent application. This office action translation is submitted now in order to supplement the understanding of the cited reference which is being disclosed in the instant Information Disclosure Statement.

English language translation of the following: Office action dated May 15, 2018 from the JPO in a Japanese patent application No. 2014-003451 corresponding to the instant patent application.

* cited by examiner

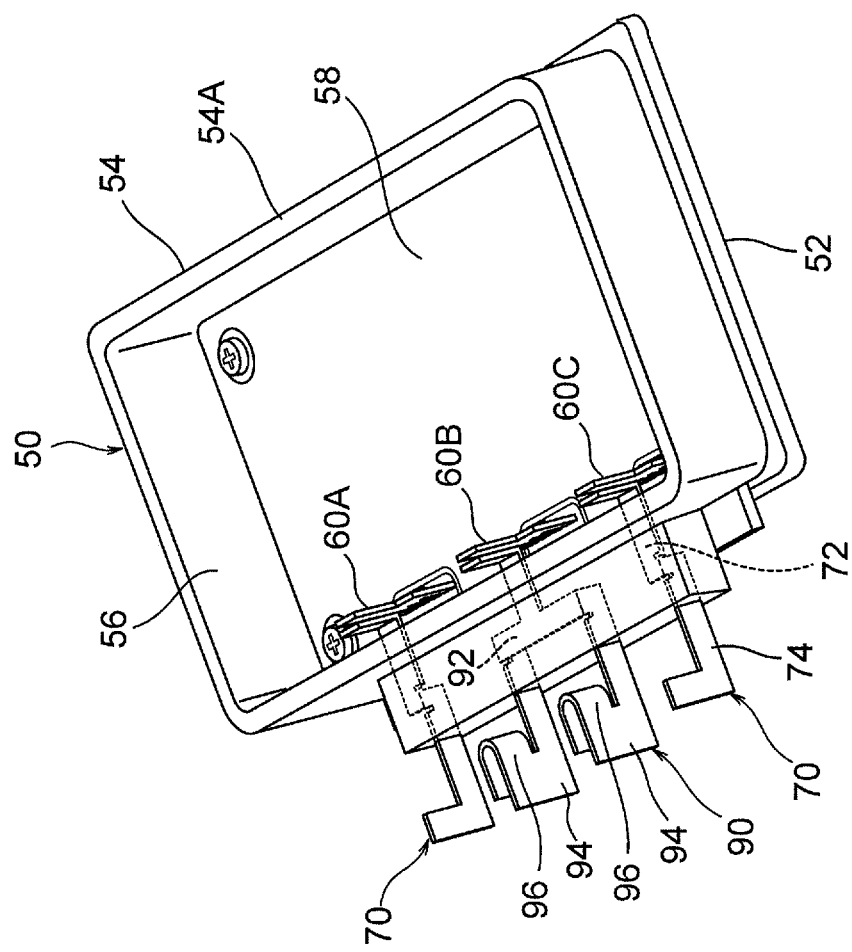
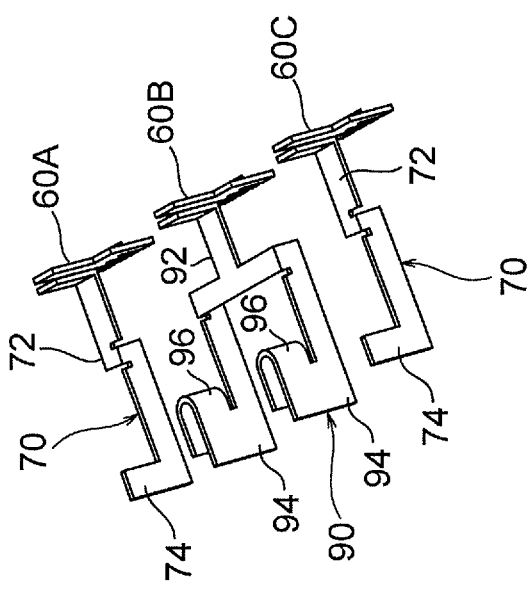

ROTARY ELECTRIC MACHINE AND METHOD OF MANUFACTURING ROTARY ELECTRIC MACHINE

CROSS-REFERENCE TO RELATED APPLICATION

This application is a continuation application of, and claims domestic priority to, U.S. patent application Ser. No. 14/224,077, filed Mar. 25, 2014, which claims priority under 35 USC 119 from Japanese Patent Applications No. 2013-077060 filed Apr. 2, 2013, No. 2013-148694 filed Jul. 17, 2013 and No. 2014-003451 filed Jan. 10, 2014. The present continuation application hereby incorporates by reference all documents referenced above.

BACKGROUND

Field of the Invention

The present invention relates to a rotary electric machine and a method of manufacturing a rotary electric machine.

Related Art

In a motor described in Japanese Patent Application Laid-Open (JP-A) No. 2010-273450, wound wire terminal portions of a wound wire wound around tooth portions extend out to one axial direction side of the motor and are retained by wound wire retaining portions. The wound wire terminal portions retained by the wound wire retaining portions are connected to circuit terminals of a circuit device via bus bars.

Generally copper wire with high electrical conductivity is employed in wound wire. A reduction in weight and reduction in costs of a motor can be achieved by employing a wound wire configured from a metal whose principal (main) component is aluminum, for example.

SUMMARY

The present invention provides a rotary electric machine that enables good electrical continuity between a wound wire and a circuit terminal whilst suppressing an increase in costs even in a case in which the wound wire is configured from a metal whose principal component is aluminum, and a method of manufacturing a rotary electric machine.

A rotary electric machine of a first aspect of the present invention includes:

a cover that configures an outline of a sealed circuit chamber;

a drive circuit section that is housed inside the circuit chamber and that drives a motor section;

a circuit terminal that is provided at the drive circuit section inside the circuit chamber, and that is configured from a conductive metal other than aluminum; and a wound wire that is wound around a tooth portion of an armature core in the motor section, that is configured from a metal whose principal component is aluminum, and that has a terminal portion that is directly joined to the circuit terminal or is joined to the circuit terminal via a coupling member that is configured from a metal whose principal component is aluminum.

According to the rotary electric machine of the first aspect, the inside portion of the cover configures the sealed circuit chamber, and the drive circuit section is housed inside the circuit chamber. The drive circuit section is provided with the circuit terminal, and the circuit terminal is disposed inside the circuit chamber. The circuit terminal is configured from a metal with electrical conductivity different from aluminum.

The terminal portion of the wound wire wound around the tooth portion of the armature core in the motor section is directly joined to the circuit terminal or joined to the circuit terminal via the coupling member. The wound wire and the coupling member are configured from metal whose principal component is aluminum. The circuit terminal that is configured from a metal with electrical conductivity different from aluminum and "the wound wire or the coupling member" configured from metal with a principal component of aluminum are accordingly joined together inside the circuit chamber. The circuit terminal and "the wound wire or the coupling member" are accordingly joined together inside the circuit chamber for which water resistant properties are secured. Corrosion at a join site between the circuit terminal and "the wound wire or the coupling member" is accordingly suppressed. There is therefore no need to coat the join site with for example a sealing material in order to suppress corrosion at the join site. Good electrical continuity (conduction) is accordingly enabled between the circuit terminal and the wound wire whilst suppressing an increase in costs.

A rotary electric machine of a second aspect of the present invention is the rotary electric machine of the first aspect, wherein the circuit chamber is disposed adjacent to the motor section as viewed along an axial direction of the motor section.

In the rotary electric machine of the second aspect, the circuit chamber is disposed adjacent to the motor section, thereby enabling for example heat generated by the motor section to be suppressed from affecting the drive circuit section, and enabling an increase in size of the rotary electric machine in the motor section axial direction to be suppressed.

A rotary electric machine of a third aspect of the present invention is the rotary electric machine of the second aspect, wherein the terminal portion of the wound wire is joined to the circuit terminal via the coupling member.

According to the rotary electric machine of the third aspect, by joining the coupling member that is joined to the wound wire to the circuit terminal, inside the circuit chamber, good electrical continuity is enabled between the circuit terminal and the wound wire whilst suppressing an increase in costs, even in a case in which for example the wound wire in an existing rotary electric machine with a coupling member is replaced with a metal whose principal component is aluminum. Moreover, for example the drive circuit section can be housed inside the circuit chamber after joining the coupling member and the circuit terminal together by using welding. Electrode (terminal) space can accordingly be easily secured during welding of the coupling member and the circuit terminal since welding of the coupling member and the circuit terminal is performed outside the circuit chamber. Moreover, for example circuit components can be provided to the drive circuit section after joining together the coupling member and the circuit terminal in advance by using welding. Spatter during welding can accordingly be suppressed from affecting circuit components.

A rotary electric machine of a fourth aspect of the present invention is the rotary electric machine of the third aspect, wherein the coupling member is joined to the circuit terminal, and includes a plurality of join portions which are respectively joined to terminal portions of wound wires.

According to the rotary electric machine of the fourth aspect, the coupling member includes the plural join portions joined to respective terminal portions of the wound wires, therefore, the number of join locations between the coupling member and the circuit terminal where different metals are joined together can be set smaller than the number of join locations between the terminal portions of the wound wires and the join portions of the coupling member where the same metals are joined together. The reliability of the rotary electric machine can accordingly be enhanced.

A rotary electric machine of a fifth aspect of the present invention is the rotary electric machine of the fourth aspect, wherein a plurality of terminal portions of the wound wires, which are in a bundled state, are joined to each of the join portions.

In the rotary electric machine of the fifth aspect, plural terminal portions of the wound wires are joined to each of the join portions in the plural terminal portions being in bundled state, thereby enabling a reduction in the number of join locations between the terminal portions of the wound wires and the join portion. This thereby enables a contribution to be made to reduce the number of assembly processes of the rotary electric machine.

A rotary electric machine of a sixth aspect of the present invention is the rotary electric machine of any one of the third aspect to the fifth aspect, wherein the coupling member is formed integrally with the cover.

According to the rotary electric machine of the sixth aspect, the coupling member is integrally formed to the cover, enabling a water resistant structure to be easily achieved at a portion where the coupling member passes through the cover.

A rotary electric machine of a seventh aspect of the present invention is the rotary electric machine of the first aspect, wherein the wound wire extends from the motor section to inside the circuit chamber, and the terminal portion of the wound wire is directly joined to the circuit terminal.

According to the rotary electric machine of the seventh aspect, the wound wire extends from the motor section to inside the circuit chamber, and the terminal portion of the wound wire is directly joined to the circuit terminal, therefore, there is no need to join the wound wire at the outside of the circuit chamber. A reduction in costs can accordingly be achieved for the rotary electric machine.

A rotary electric machine of an eighth aspect of the present invention is the rotary electric machine of any one of the first aspect to the seventh aspect, wherein the circuit terminal is configured from a metal whose principal component is copper, and a join site of the circuit terminal with the wound wire or with the coupling member is plated with tin.

According to the rotary electric machine of the eighth aspect, the circuit terminal is configured from a metal whose principal component is copper. The join site of the circuit terminal with the wound wire or with the coupling member is tin plated. Corrosion can thereby be efficiently suppressed at the join site between the circuit terminal and "the wound wire or the coupling member". Namely, supposing a case in which the circuit terminal was not tin plated, a voltage difference between the non-tin plated circuit terminal and "the wound wire or the coupling member" would be greater than the voltage difference between the plated portion of the tin plated circuit terminal and "the wound wire or the coupling member". Accordingly, by performing tin plating to the circuit terminal, the join site voltage difference between the plated portion of the circuit terminal and "the wound wire or the coupling member" to be small, thereby enabling corrosion to be efficiently suppressed from occurring at the join site at the circuit terminal with "the wound wire or the coupling member".

A method of manufacturing a rotary electric machine of a ninth aspect of the present invention is applied to the rotary electric machine of the sixth aspect, the method including:

a first joining process in which the coupling member and the circuit terminal are joined; and a molding process in which the coupling member joined to the circuit terminal is formed integrally with the cover.

In the rotary electric machine manufacturing method of the ninth aspect, the coupling member is integrally formed with the cover after joining together the coupling member and the circuit terminal. The circuit terminal that has been welded to the coupling member in advance can thereby be provided (mounted) to a circuit board. Space for the electrodes during welding of the coupling member to the circuit terminal can accordingly be easily secured since welding of the coupling member to the circuit terminal can be performed outside the circuit chamber, for example. Spatter during welding of the coupling member and the circuit terminal can moreover be suppressed from affecting circuit components.

A method of manufacturing a rotary electric machine of a tenth aspect of the present invention is the method of manufacturing a rotary electric machine of the ninth aspect, further including: a second joining process in which the coupling member joined to the circuit terminal and the terminal portion of the wound wire are joined, wherein the second joining process is performed after the first joining process is performed.

According to the rotary electric machine manufacturing method of the tenth aspect, the coupling member is joined to the terminal portion of the wound wire after joining together the coupling member and the circuit terminal. Ease of assembly of the rotary electric machine can accordingly be enhanced.

A method of manufacturing a rotary electric machine of an eleventh aspect of the present invention is applied to the rotary electric machine of the third aspect, the method including:

a joining process in which the coupling member and the circuit terminal are joined; and a sealing process in which the circuit terminal that is joined to the coupling member is installed at the drive circuit section that is housed inside the circuit chamber, and the circuit chamber is sealed.

According to the rotary electric machine manufacturing method of the eleventh aspect, the circuit chamber is sealed after joining together the coupling member and the circuit terminal. Such a configuration also enables space for the electrodes during welding of the coupling member to the circuit terminal to be easily secured since welding of the coupling member to the circuit terminal can be performed outside the circuit chamber, for example. Spatter during welding of the coupling member and the circuit terminal can moreover be suppressed from affecting circuit components.

BRIEF DESCRIPTION OF THE DRAWINGS

Embodiments of the invention will be described in detail with reference to the following figures, wherein:

FIG. 4A is an explanatory drawing to explain a first joining process of a manufacturing method of the rotary electric machine illustrated in FIG. 1, and FIG. 4B is an explanatory drawing to explain a state in which the first terminals and the second terminal illustrated in FIG. 4A have been integrally formed to a cover;

DETAILED DESCRIPTION

First Exemplary Embodiment

Figure 1:
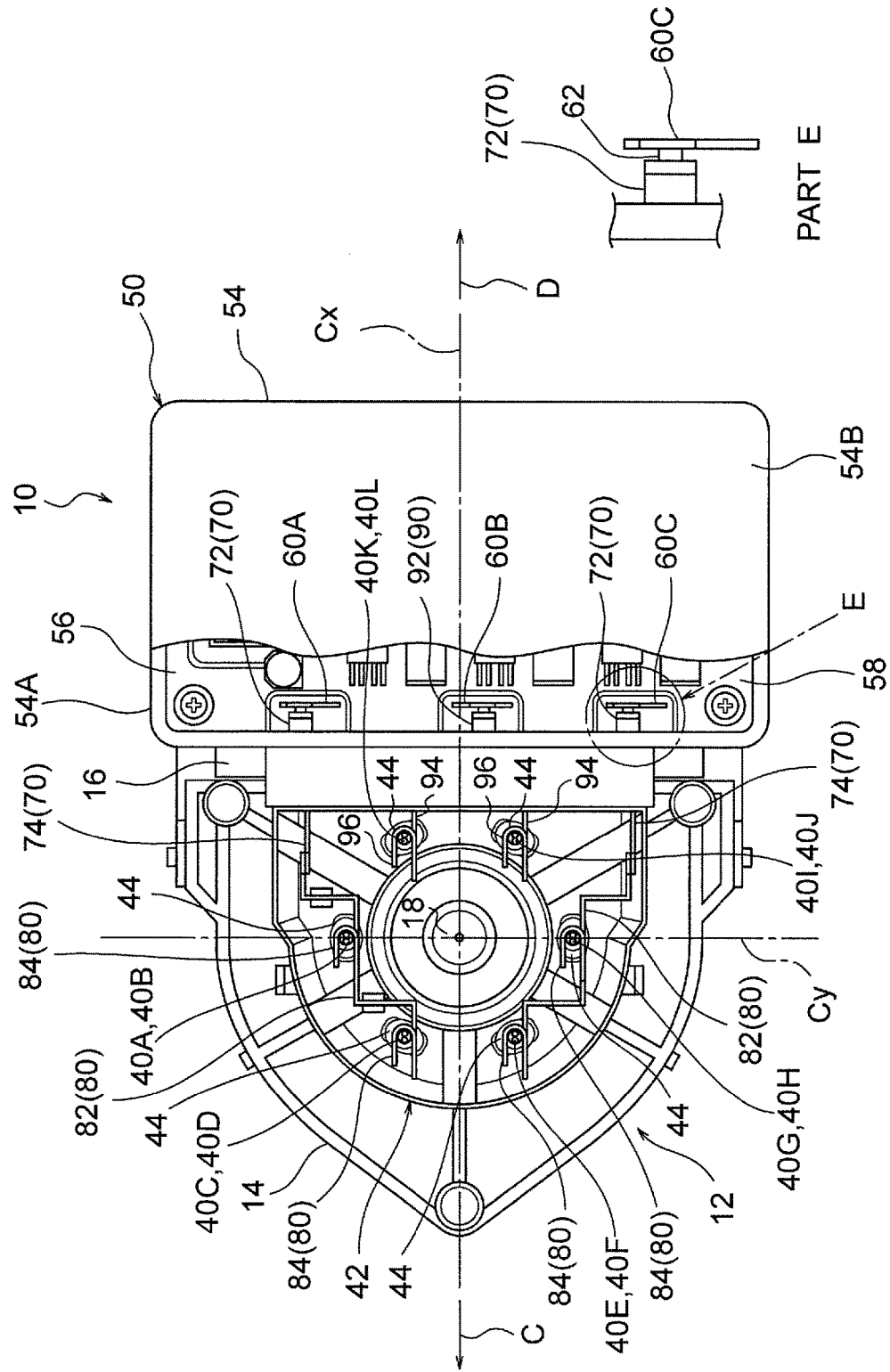
FIG. 1 is a plan view illustrating relevant portions of a rotary electric machine according to a first exemplary embodiment, as viewed from one axial direction side of the rotary electric machine.
Figure 2:
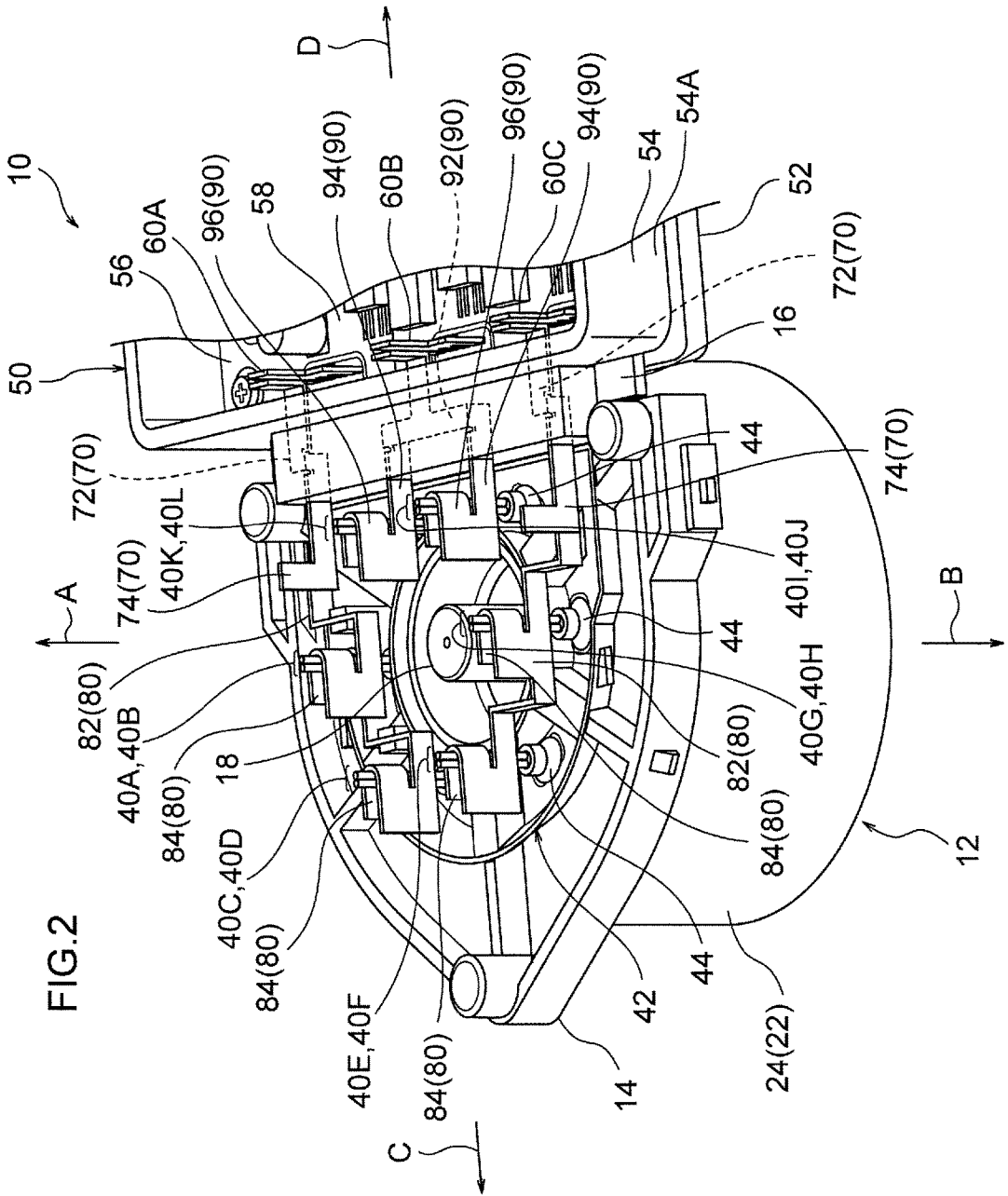
FIG. 2 is a perspective view illustrating relevant portions of the rotary electric machine illustrated in FIG. 1.
Figure 3:
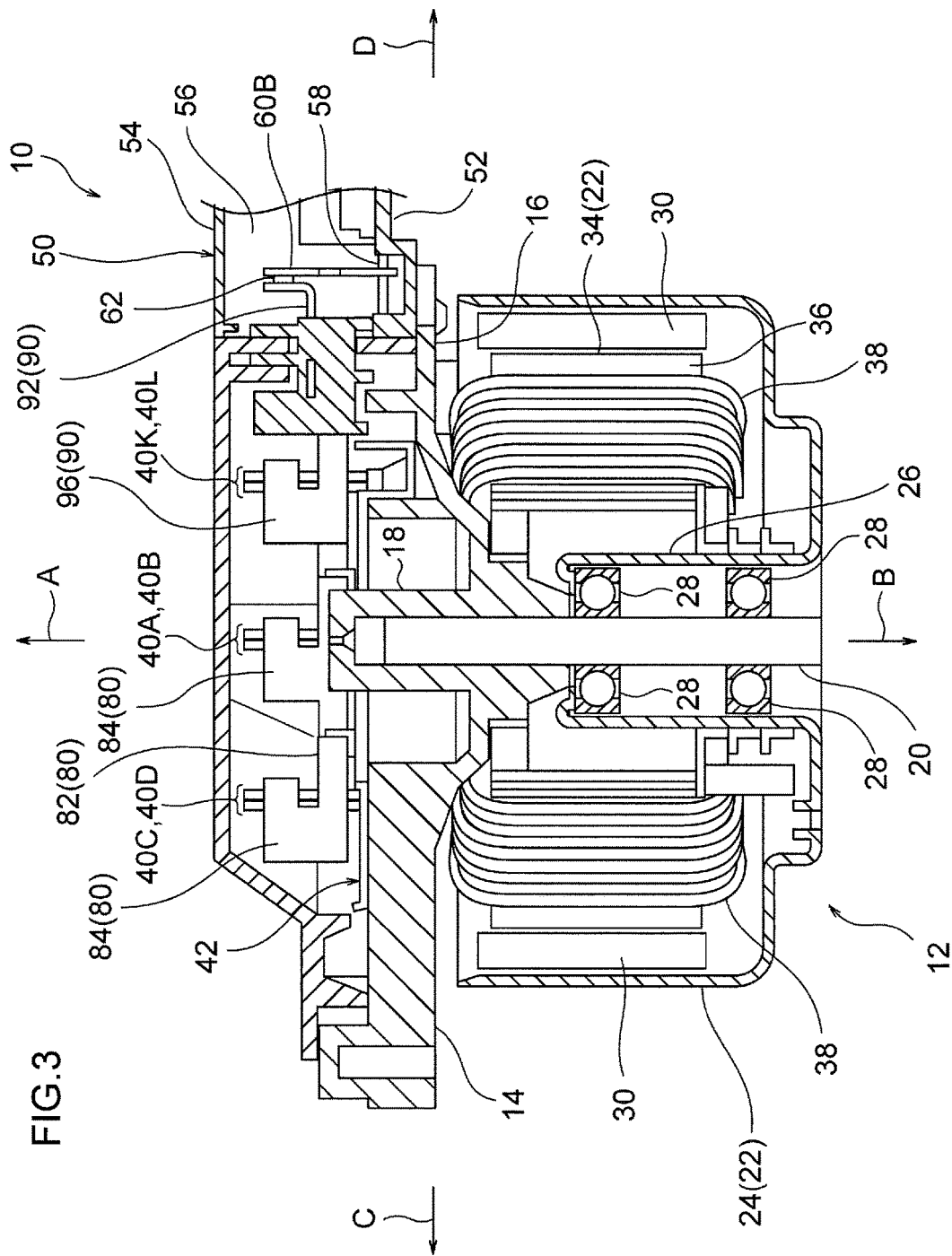
FIG. 3 is a side view cross-section illustrating relevant portions of the rotary electric machine illustrated in FIG. 2.

Explanation follows regarding a rotary electric machine 10 according to a first exemplary embodiment, with reference to FIG. 1 to FIG. 3. The rotary electric machine 10 is configured by what is referred to as an outer rotor type brushless motor, and is configured including a motor body 12 serving as a "motor section" and a circuit device 50.

The motor body 12 is provided with a substantially triangular plate shaped centerpiece 14. The centerpiece 14 is disposed with thickness direction thereof in the motor body 12 axial direction. As viewed along the motor body 12 axial direction, the centerpiece 14 is formed symmetrically about an orthogonal axis Cx (see FIG. 1) that passes through the motor body 12 axial center. One end portion of the centerpiece 14 (the end portion on the arrow D direction side in for example FIG. 1) is formed with an attachment portion 16 to which the circuit device 50, described later, is attached. The attachment portion 16 extends in an axial direction of an orthogonal axis Cy that is orthogonal to the orthogonal axis Cx, as viewed along the motor body 12 axial direction.

As illustrated in FIG. 3, a shaft portion 18 is integrally formed at a substantially central portion of the centerpiece 14. The shaft portion 18 projects out toward one axial direction side of the motor body 12 (the arrow A direction side in for example FIG. 3) and is formed substantially in the shape of a circular cylinder having a bottom portion. One end portion of a motor shaft 20 is fitted into the shaft portion 18, with the motor shaft 20 fixed so as to be non-rotatably to the centerpiece 14.

The motor body 12 is further provided with a rotor 22. The rotor 22 includes a rotor housing 24, with the rotor housing 24 open toward the one axial direction side of the motor body 12 and formed in a substantially circular cylinder shape having a bottom portion. A substantially cylinder shaped fixing portion 26 is formed at a central portion of the rotor housing 24, with the other end portion of the motor shaft 20 supported by the fixing portion 26 via bearings (shaft receiving portions) 28. The rotor 22 is thereby configured rotatable with respect to the motor shaft 20. A magnet 30 is affixed to an inner peripheral face of the rotor housing 24.

An armature core 34 of a stator 32 that configures a portion of the motor body 12 is housed inside the rotor housing 24. The armature core 34 is supported by the centerpiece 14. The armature core 34 includes plural (12 in the present exemplary embodiment) tooth portions 36, with the tooth portions 36 formed in a radial pattern centered on the motor shaft 20.

A wound wire (wire) 38 is wound onto the tooth portion 36. The wires 38 are manufactured from a wire material member configured from a metal with a principal component (main component) of aluminum (a material in the 1000 series as specified by JIS), and the wound wires 38 respectively configure a U phase, a V phase and a W phase of the motor body 12. The wound wires 38 further includes 12 wound wire terminal portions 40A to 40L, corresponding to the number of the tooth portions 36. As illustrated in FIG. 1 and FIG. 2, the wound wire terminal portions 40A to 40L of the wound wires 38 extend from the motor body 12 to the motor body 12 one axial direction side such that two wound wire terminal portions form a pair, respectively and are disposed with uniform spacing (every 60°) around the motor body 12 circumferential direction, as viewed along the motor body 12 axial direction. Specifically, the pair formed by the two wound wire terminal portions 40A, 40B and the pair formed by the two wound wire terminal portions 40G, 40H are disposed over the orthogonal axis Cy as viewed along the motor body 12 axial direction.

A retaining member 42 is provided at the one axial direction side of the motor body 12, with the retaining member 42 supported by the centerpiece 14. The retaining member 42 is manufactured from an insulating material, and is substantially formed in a shallow-bottomed recessed shape open toward the motor body 12 one axial direction side. The retaining member 42 is formed with plural (at 6 locations in the present exemplary embodiment) wound wire retaining portions 44 that retain the paired wound wire terminal portions 40A to 40L, and the wound wire retaining portions 44 are disposed at positions corresponding to the respective pairs of the wound wire terminal portions 40A to 40L. The wound wire retaining portions 44 are formed in substantially cylindrical shapes, and the respective pairs of the wound wire terminal portions 40A to 40L are inserted and retained inside the wound wire retaining portions 44.

The circuit device 50 is disposed on the motor body 12 one axial direction side, and is disposed displaced to the attachment portion 16 side of the centerpiece 14 as viewed along the motor body 12 axial direction. In other words, the circuit device 50 is disposed adjacent to the motor body 12 as viewed along the motor body 12 axial direction. The circuit device 50 is configured including a substantially rectangular plate shaped base portion 52 that is fixed to the attachment portion 16 of the centerpiece 14, and a cover 54 that is disposed to the motor body 12 one axial direction side of the base portion 52. The cover 54 is configured as a substantially rectangular box shape that is open toward the motor body 12 other axial direction side (the arrow B direction side in FIG. 2). Specifically, the cover 54 is configured including a frame portion 54A formed in a substantially rectangular frame shape, and a bottom wall 54B that closes off one end portion of the frame portion 54A (in FIG. 2 the bottom wall 54B of the cover 54 is omitted from illustration for the sake of convenience). The frame portion 54A and the bottom wall 54B are fixed together by a method such as welding. The base portion 52 and the cover 54 are assembled together so as to give a sealed state between the cover 54 and the base portion 52. The space inside the cover 54 configures a circuit chamber 56, with the circuit chamber 56 sealed by the base portion 52 and the cover 54. Namely, an outline of the circuit chamber 56 is configured by the base portion 52 and the cover 54, thereby securing water resistant properties for the circuit chamber 56.

A circuit board (substrate) 58 serving as a "drive circuit section" is housed inside the circuit chamber 56. The circuit board 58 is fixed to the base portion 52. A motor body 12 end side of the circuit board 58 is provided with plural (3 in the present exemplary embodiment) circuit terminals 60A to 60C serving as "circuit terminals". The circuit terminals 60A to 60C are configured from a metal with a principal component of copper (brass in the present exemplary embodiment), and surfaces of the circuit terminals 60A to 60C are tin plated. The circuit terminals 60A to 60C are formed in substantially plate shapes, with the plate thickness direction disposed in the orthogonal axis Cx axial direction with the circuit terminals 60A to 60C projecting out from the circuit board 58 toward the motor body 12 one axial direction side. The circuit terminals 60A to 60C are moreover disposed in a row running parallel to the orthogonal axis Cy. Upper portions of the circuit terminals 60A to 60C are respectively formed with protrusion portions 62 that protrude toward the motor body 12 side (see part E in FIG. 1), and the circuit terminals 60A to 60C are joined by the protrusion portions 62 to first terminals 70 and a second terminal 90, described later, by welding.

The circuit board 58 is connected to the wound wire terminal portions 40A to 40L of the wound wire 38 through a pair of the first terminals 70, a pair of bus bars 80, and the second terminal 90. The first terminals 70, the bus bars 80, and the second terminal 90 are respectively configured from metal with a principal component of aluminum (a material in the 1000 series as specified in JIS), with each of these members corresponding to "coupling members" of the present invention. Explanation follows regarding the respective configurations thereof.

As illustrated in FIG. 2, the first terminals 70 are respectively disposed to the motor body 12 side of the circuit terminals 60A and 60C (on the arrow C direction side in for example FIG. 2). The first terminals 70 are each formed in a substantially elongated plate shape, with length direction disposed in the orthogonal axis Cx axial direction (see FIG. 1). The first terminals 70 are each configured including a first terminal base portion 72 configuring circuit terminals 60A and 60C side (the arrow D direction side in for example FIG. 2) portions of the first terminals 70, and a first terminal connection portion 74 configuring motor body 12 side portions of the first terminals 70. Length direction intermediate portions of the first terminals 70 are integrally formed with a side wall (the frame portion 54A) on the motor body 12 side of the cover 54 using insert molding. The first terminal base portions 72 accordingly extend from the side wall (frame portion 54A) of the cover 54 to inside the circuit chamber 56, and the first terminal connection portions 74 extend from the side wall (frame portion 54A) of the cover 54 toward the motor body 12 side.

The first terminal base portions 72 are disposed with the plate thickness direction in the motor body 12 axial direction. One end portions (circuit terminal 60A and 60C side end portions) of the first terminal base portions 72 are bent toward the motor body 12 one axial direction side so as to face (the protrusion portions 62 of) the circuit terminals 60A and 60C, and are joined to the circuit terminals 60A and 60C using for example projection welding. Namely, the first terminals 70 are joined to the circuit terminals 60A and 60C inside the circuit chamber 56.

The first terminal connection portions 74 are disposed with the plate thickness direction in the orthogonal axis Cy axial direction (see FIG. 1), and extend from width direction one end portions of other end portions of the first terminal base portions 72 toward the motor body 12 side. The first terminal connection portions 74 are respectively formed with a substantially L-shape with leading end portions projecting out toward the motor body 12 one axial direction side as viewed from the side.

The pair of bus bars 80 are disposed on the opposite side of the first terminals 70 to the circuit device 50. The bus bars 80 are each configured including a bus bar connection portion 82 and a pair of bus bar join portions 84 that serve as "join portions". The bus bar connection portions 82 of the pair of bus bars 80 are formed in substantially elongated plate shapes, and are bent into stepped shapes to give left and right symmetry about the orthogonal axis Cx as viewed along the motor body 12 axial direction (see FIG. 1). Specifically, one end portions (circuit device 50 side end portions) of the bus bar connection portions 82 are disposed with the plate thickness direction in the orthogonal axis Cy axial direction, and are joined to other end portions of the first terminals 70 using for example TIG welding. Length direction intermediate portions of the bus bar connection portions 82 are bent into a substantially crank shape so as to approach the orthogonal axis Cx on progression toward the opposite side to the circuit device 50 (the arrow C direction in for example FIG. 1) as viewed along the motor body 12 axial direction (see FIG. 1). Other end portions of the bus bar connection portions 82 (the end portions on the opposite side to the circuit device 50) are disposed with the plate thickness direction in the orthogonal axis Cy axial direction.

The bus bar join portions 84 are respectively integrally formed to the length direction intermediate portion and the other end portion of each of the pair of bus bar connection portions 82. The bus bar join portions 84 are respectively disposed at positions adjacent to the paired two wound wire terminal portions 40A, 40B, the paired two wound wire terminal portions 40C, 40D, the paired two wound wire terminal portions 40E, 40F, and the paired two wound wire terminal portions 40G, 40H. The bus bar join portions 84 extend from the bus bar connection portions 82 toward the motor body 12 one axial direction side, and are bent round into substantially U-shapes open toward the opposite side to the circuit device 50 as viewed along the motor body 12 axial direction. The paired two wound wire terminal portions 40A, 40B, the paired two wound wire terminal portions 40C, 40D, the paired two wound wire terminal portions 40E, 40F, and the paired two wound wire terminal portions 40G, 40H are inserted inside the respective bus bar join portions 84 in a bundled state, and are joined to the bus bar join portions 84 using for example TIG welding. The circuit terminal 60A is thereby connected (coupled) with the wound wire terminal portions 40A, 40B and the wound wire terminal portions 40C, 40D, and the circuit terminal 60C is connected (coupled) with the wound wire terminal portions 40E, 40F and the wound wire terminal portions 40G, 40H through the first terminals 70 and the bus bars 80.

The second terminal 90 is disposed at the motor body 12 side of the circuit terminal 60B, and is formed in a substantially Y-shaped plate shape as viewed along the motor body 12 axial direction. The second terminal 90 is configured including a second terminal base portion 92 that configures a circuit terminal 60B side portion of the second terminal 90, and a pair of second terminal connection portions 94 that configure a motor body 12 side portion of the second terminal 90. The second terminal 90 is moreover integrally formed to the side wall (frame portion 54A) on the motor body 12 side of the cover 54 using insert molding, and the second terminal base portion 92 extends from the side wall (frame portion 54A) of the cover 54 toward the circuit chamber 56 inside, and the pair of second terminal connection portions 94 extend from the side wall (frame portion 54A) of the cover 54 toward the motor body 12 side.

The second terminal base portion 92 is formed in a substantially T-shaped plate shape as viewed along the motor body 12 axial direction, and is disposed with the plate thickness direction in the motor body 12 axial direction. Specifically, the second terminal base portion 92 extends from the circuit terminal 60B toward the motor body 12 side, and a motor body 12 side end portion of the second terminal base portion 92 branches into two along the orthogonal axis Cy axial direction. One end portion of the second terminal base portion 92 (the circuit terminal 60B side end portion) is bent toward the motor body 12 one axial direction side so as to face the circuit terminal 60B, and is joined to the circuit terminal 60B using for example projection welding. Namely, the second terminal 90 and the circuit terminal 60B are joined together inside the circuit device 50.

The pair of second terminal connection portions 94 are disposed with the plate thickness direction in the orthogonal axis Cy axial direction, and respectively extend from both end portions of the branched second terminal base portion 92 toward the motor body 12 side. Leading end portions (motor body 12 side end portions) of the second terminal connection portions 94 are integrally formed with second terminal join portions 96 serving as "join portions", with the second terminal join portions 96 extending from the respective leading end portions toward the motor body 12 one axial direction side, and are bent round into substantially U-shapes open toward the opposite side to the circuit device 50 as viewed along the motor body 12 axial direction. The paired two wound wire terminal portions 40I, 40J and the paired two wound wire terminal portions 40K, 40L are respectively inserted inside the second terminal join portions 96 in a bundled state, and are joined to the second terminal join portions 96 using for example TIG welding. The wound wire terminal portions 40I, 40J and wound wire terminal portions 40K, 40L and the circuit terminal 60B are thereby connected (coupled) together through the second terminal 90.

Explanation follows regarding a manufacturing method of the rotary electric machine 10 according to the first exemplary embodiment.

Firstly, as illustrated in FIG. 4A, one end portions of the first terminal base portions 72 of the first terminals 70 and the protrusion portions 62 (not shown in FIG. 4A) of the circuit terminals 60A and 60C are disposed facing each other, and the first terminals 70 are joined to the circuit terminals 60A and 60C using for example projection welding (first joining process or joining process). One end portion of the second terminal base portion 92 of the second terminal 90 and the protrusion portion 62 (not shown in FIG. 4A) of the circuit terminal 60B are disposed facing each other, and the second terminal 90 and the circuit terminal 60B are joined together using for example projection welding (first joining process or joining process).

Next, the pair of first terminals 70 joined to the respective circuit terminals 60A and 60C and the second terminal 90 joined to the circuit terminal 60B are integrally formed with (the frame portion 54A of) the cover 54 using insert molding (molding process).

Next, as illustrated in FIG. 4B, the frame portion 54A of the cover 54 is disposed on the base portion 52 so as to cover the circuit board 58 that is fixed to the base portion 52 of the circuit device 50. The frame portion 54A of the cover 54 is assembled to the base portion 52 whilst sealing between the cover 54 and the base portion 52. When this is performed, termination portions (not shown in the drawings) of the circuit terminals 60A to 60C are inserted into through holes (not shown in the drawings) formed to the circuit board 58, and the circuit terminals 60A to 60C are soldered to the circuit board 58.

Then, the bottom wall 54B of the cover 54 is disposed so as to close off one end side (the opposite side to the base portion 52) of the frame portion 54A of the cover 54, and the bottom wall 54B is fixed to the frame portion 54A. The circuit device 50 is thereby formed into a unit with the circuit chamber 56 in a sealed state (sealing process).

Figure 5:
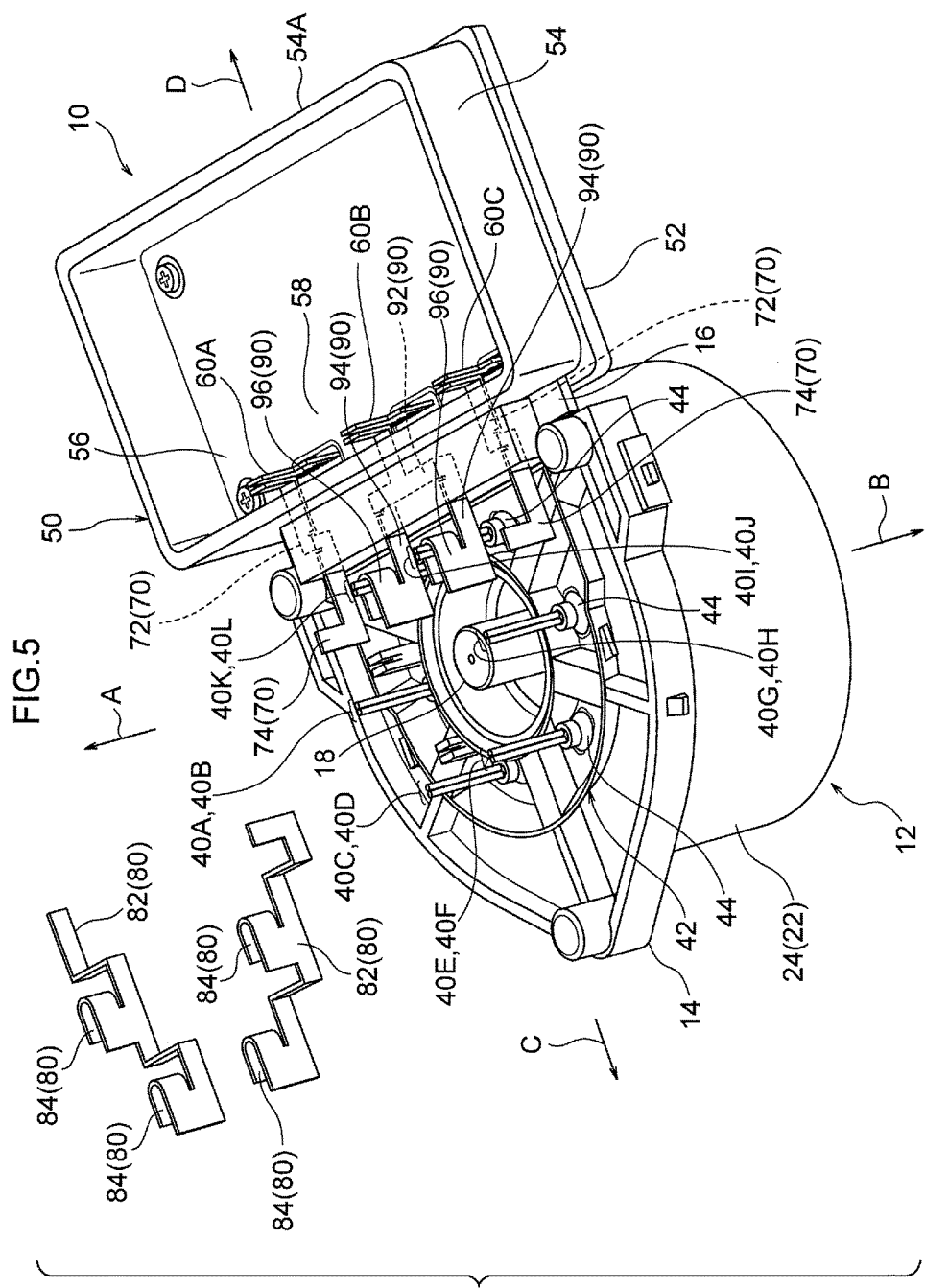
FIG. 5 is an explanatory drawing to explain assembly of a bus bar to a motor body to which the circuit device illustrated in FIG. 4B has been assembled.

As illustrated in FIG. 5, the circuit device 50 configured in this state is disposed at the side of the motor body 12, and the base portion 52 of the circuit device 50 is fixed to the attachment portion 16 of the centerpiece 14. When this is performed, the paired two wound wire terminal portions 40I, 40J and the paired two wound wire terminal portions 40K, 40L are respectively inserted inside the second terminal join portions 96 of the second terminal 90 in bundled states. The wound wire terminal portions 40I, 40J and wound wire terminal portions 40K, 40L are then respectively joined to the second terminal join portions 96 using for example TIG welding (second joining process). The wound wire terminal portions 40I, 40J and wound wire terminal portions 40K, 40L are thereby connected (coupled) to the circuit terminal 60B through the second terminal 90.

Next, the pair of bus bars 80 are assembled to the motor body 12 from the motor body 12 one axial direction side. Specifically, the paired two wound wire terminal portions 40A, 40B and the paired two wound wire terminal portions 40C, 40D are inserted inside the bus bar join portions 84 of one of the bus bars 80, and the wound wire terminal portions 40A, 40B and wound wire terminal portions 40C, 40D are joined to the bus bar join portions 84 using for example TIG welding (second joining process). The paired two wound wire terminal portions 40E, 40F and the paired two wound wire terminal portions 40G, 40H are inserted inside the bus bar join portions 84 of the other of the bus bars 80, and the wound wire terminal portions 40E, 40F and wound wire terminal portions 40G, 40H are joined to the bus bar join portions 84 using for example TIG welding (second joining process). The bus bar connection portions 82 of the bus bars 80 are also joined to the first terminals 70 using for example TIG welding. The wound wire terminal portions 40A, 40B and wound wire terminal portions 40C, 40D are thereby connected (coupled) to the circuit terminal 60A, and the wound wire terminal portions 40E, 40F and the wound wire terminal portions 40G, 40H are connected (coupled) to the circuit terminal 60C, through the first terminals 70 and the bus bars 80.

Explanation follows regarding operation and advantageous effects of the present exemplary embodiment.

In the rotary electric machine 10 configured as described above, the circuit board 58 is housed inside the circuit chamber 56, and the circuit board 58 is provided with the brass circuit terminals 60A to 60C. The wound wires 38 of the motor body 12, the pair of first terminals 70, the pair of bus bars 80 and the second terminal 90 are respectively configured from metal with a principal component of aluminum.

The wound wire terminal portions 40A to 40L of the wound wires 38 in the motor body 12 are joined to the circuit terminals 60A to 60C through the pair of bus bars 80, the pair of first terminals 70 and the second terminal 90. Specifically, the paired two wound wire terminal portions 40A, 40B, the paired two wound wire terminal portions 40C, 40D, the paired two wound wire terminal portions 40E, 40F, and the paired two wound wire terminal portions 40G, 40H are joined to the bus bar join portions 84 of the bus bars 80, and the bus bars 80 are joined to the first terminals 70. The first terminals 70 and the circuit terminals 60A and 60C are joined together inside the circuit chamber 56. The paired two wound wire terminal portions 40I, 40J and the paired two wound wire terminal portions 40K, 40L are joined to the second terminal join portions 96 of the second terminal 90, and the second terminal 90 and the circuit terminal 60B are joined together inside the circuit chamber 56.

The circuit terminals 60A to 60C configured from a metal (brass) with an electrical conductivity different to aluminum, and the first terminals 70 and the second terminal 90 that are configured from a metal with a principal component of aluminum are joined together inside the circuit chamber 56 for which water resistance properties are secured (are high). As a result, corrosion at the join sites of the first terminals 70 and the second terminal 90 in the circuit terminals 60A to 60C is suppressed. It is therefore not necessary to coat the join sites with for example a sealing material in order to suppress corrosion. Good electrical continuity is accordingly enabled between the circuit terminals 60A to 60C and the wound wires 38 whilst suppressing an increase in costs, even when the wound wire 38 is configured from a metal with a principal component of aluminum.

As described above, the wound wire terminal portions 40A to 40L are joined to the circuit terminals 60A to 60C through coupling members (the pair of first terminals 70, the pair of bus bars 80, and the second terminal 90). Good electrical continuity between circuit terminals and wound wires is accordingly enabled whilst suppressing an increase in costs, even for example when the wound wires in an existing rotary electric machine that includes coupling members are replaced with a metal with a principal component of aluminum, by configuring the rotary electric machine similarly to the rotary electric machine 10 of the present exemplary embodiment.

The one end portion of the second terminal 90 is joined to the circuit terminal 60B, and the second terminal join portions 96, to which the paired two wound wire terminal portions 40I, 40J and the paired two wound wire terminal portions 40K, 40L are joined, are formed at 2 locations at the second terminal 90. One end portions of the bus bars 80 are joined to the first terminals 70, and the bus bar join portions 84, to which the paired two wound wire terminal portions 40A, 40B and the paired two wound wire terminal portions 40C, 40D (the paired two wound wire terminal portions 40E, 40F and the paired two wound wire terminal portions 40G, 40G) are joined, are formed at 2 locations on each of the bus bars 80. There are accordingly fewer join locations (3 locations) of the first terminals 70 and second terminal 90 with the circuit terminals 60A to 60C than there are join locations of the bus bars 80 and second terminal 90 with the wound wire terminal portions 40A to 40L (6 locations). The reliability of the rotary electric machine 10 can accordingly be enhanced, since the number of join locations between different metals (the join locations of the first terminals 70 and the second terminal 90 with the circuit terminals 60A to 60C) can be reduced.

The first terminals 70 and the second terminal 90 are moreover integrally formed with the cover 54 using insert molding. A water resistant structure can accordingly be simply achieved at portions where the first terminals 70 and the second terminal 90 pass through the cover 54.

The surfaces of the circuit terminals 60A to 60C are tin plated. Corrosion can therefore be efficiently suppressed at join sites of the circuit terminals 60A to 60C with the coupling members (the first terminals 70 and the second terminal 90). Namely, supposing a case in which the circuit terminals 60A to 60C were not tin plated, a voltage difference (of around 0.5V) between such non-tin plated circuit terminals 60A to 60C and the coupling members would be greater than the voltage difference (of around 0.25V) between the plated portions of the tin plated circuit terminals 60A to 60C and the coupling members such as in the present exemplary embodiment. Accordingly, tin plating the circuit terminals 60A to 60C enables voltage difference between the join sites of the circuit terminals 60A to 60C with the coupling members (the first terminals 70 and the second terminal 90) to be set to a small amount. Corrosion can accordingly be efficiently suppressed at the join sites of the circuit terminals 60A to 60C with the coupling members.

The circuit device 50 is disposed adjacent to the motor body 12 as viewed along the motor body 12 axial direction. Heat generated by the motor body 12 can accordingly be suppressed from affecting the circuit board 58, and an increase in size of the rotary electric machine 10 along the motor body 12 axial direction can be suppressed.

The first terminal 70 and the bus bar 80 form a divided configuration between the paired two wound wire terminal portions 40A, 40B and the paired two wound wire terminal portions 40C, 40D, and the circuit terminal 60A, also, the first terminal 70 and the bus bar 80 form a divided configuration between the paired two wound wire terminal portions 40E, 40F and the paired two wound wire terminal portions 40G, 40H, and the circuit terminals 60C. The amount that the first terminals 70 project out from the cover 54 can accordingly be suppressed compared to, for example, when the first terminals 70 and the bus bars 80 are formed integrally to one another. An increase in size of the cover 54 can accordingly be suppressed, and ease of assembly during assembly of the circuit device 50 to the motor body 12 can also be enhanced.

The paired two wound wire terminal portions 40A, 40B, the paired two wound wire terminal portions 40C, 40D, the paired two wound wire terminal portions 40E, 40F and the paired two wound wire terminal portions 40G, 40H are respectively joined to the bus bar join portions 84 in a bundled state. The paired two wound wire terminal portions 40I, 40J and the paired two wound wire terminal portions 40K, 40L are respectively joined to the second terminal join portions 96 of the second terminal 90 in a bundled state. The number of join locations between the wound wire terminal portions 40A to 40L and the bus bars 80 and second terminal 90 can accordingly be reduced. A contribution can therefore be made to reducing the number of assembly processes of the rotary electric machine 10.

In the rotary electric machine 10, after the first terminals 70 and the circuit terminals 60A and 60C have been joined together by welding, and after the second terminal 90 and the circuit terminal 60B have been joined together by welding, the first terminals 70 and the second terminal 90 are integrally formed to the cover 54 using insert molding. The first terminals 70 and the second terminal 90 can accordingly be welded to the circuit terminals 60A to 60C outside of the circuit chamber 56, thus easily securing enough space for the electrodes during welding of the first terminals 70 and the second terminal 90 to the circuit terminals 60A to 60C. The circuit terminals 60A to 60C welded to the first terminals 70 and the second terminal 90 can be provided (mounted) to the circuit board 58. Spatter during welding can accordingly be suppressed from affecting circuit components on the circuit board 58.

In the first exemplary embodiment, the wound wire terminal portions 40A to 40L are joined to the bus bars 80 and the second terminal 90 after the first terminals 70 have been joined to the circuit terminals 60A and 60C and after the second terminal 90 has been joined to the circuit terminal 60B. Ease of assembly of the rotary electric machine 10 can accordingly be enhanced. Namely, supposing a case in which the first terminals 70 and the second terminal 90 were connected to the circuit terminals 60A to 60C after the wound wire terminal portions 40A to 40L had been joined to the bus bars 80 and the second terminal 90, there would be an issue of having to join (weld) the first terminals 70 and the second terminal 90 to the circuit terminals 60A to 60C in a coupled state of the first terminals 70 and the second terminal 90 to the motor body 12. There would be moreover be an issue with integrally molding the first terminals 70 and the second terminal 90 to the cover 54 in this state, this being detrimental to the molding. In contrast, in the first exemplary embodiment, the wound wire terminal portions 40A to 40L are joined to the bus bars 80 and the second terminal 90 after joining the first terminals 70 and the second terminal 90 to the circuit terminals 60A to 60C, thereby eliminating such issues, and enabling the ease of assembly of the rotary electric machine 10 to be enhanced.

Figure 6:
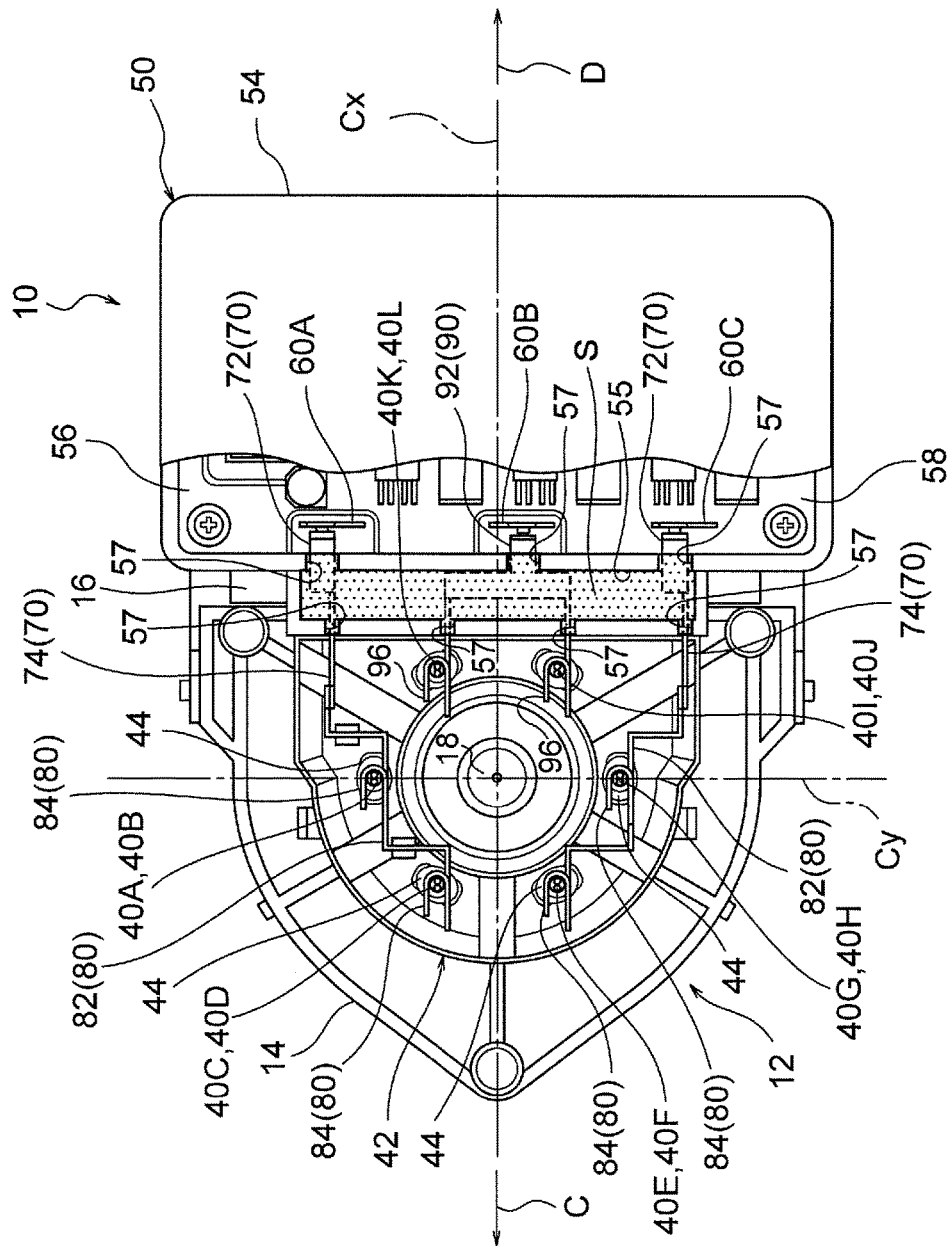
FIG. 6 is a plan view illustrating another example of integration of the cover with the first terminals and the second terminal illustrated in FIG. 1.

Note that in the first exemplary embodiment, the first terminals 70 and the second terminal 90 are integrally formed to the cover 54 using insert molding. Alternatively, the first terminals 70 and the second terminal 90 may for example be integrated to the cover 54 by assembling the first terminals 70 and the second terminal 90 to the cover 54 through a sealing material. Specifically, as illustrated in FIG. 6, a bottomed recessed portion 55 that is open toward the motor body 12 one axial direction side may be formed at an outer side of the frame portion 54A of the cover 54. Slits 57 into which the first terminals 70 and the second terminal 90 are inserted are formed to a side wall of the frame portion 54A and a side wall of the recessed portion 55, and the first terminals 70 and the second terminal 90 are assembled in an state inserted into the slits 57. A sealing material S is filled into the recessed portion 55 and the slits 57, thus sealing the circuit chamber 56.

Such a configuration enables, for example, the circuit board 58 to be housed inside the circuit chamber 56 after the first terminals 70 and the second terminal 90 have been joined to the circuit terminals 60A to 60C by welding. Similarly to as described above, enough space for the electrodes during welding of the first terminals 70 and the second terminal 90 to the circuit terminals 60A to 60C can be easily secured since the first terminals 70 and the second terminal 90 can be welded to the circuit terminals 60A to 60C outside the circuit chamber 56. Moreover, such a configuration enables the circuit terminals 60A to 60C to be disposed on the circuit board 58 after integrating the first terminals 70 and the second terminal 90 that are joined to the circuit terminals 60A to 60C with the cover 54. Alternatively, the first terminals 70 and the second terminal 90 can be integrated with the cover 54 after disposing the circuit terminals 60A to 60C that are joined to the first terminals 70 and the second terminal 90 on the circuit board 58. Such a configuration also accordingly enables spatter during welding to be suppressed from affecting circuit components.

In the first exemplary embodiment, the first terminals 70 and the bus bars 80 have a divided configuration, however the first terminals 70 and the bus bars 80 may be integrally formed to configure single members.

In the first exemplary embodiment, two wound wires 38 are joined to each of the bus bar join portions 84 and the second terminal join portions 96 using TIG welding, however the number of the wound wires 38 that are joined to each of the bus bar join portions 84 and the second terminal join portions 96 may be set as appropriate depending on the specifications of the rotary electric machine 10. The number of the bus bar join portions 84 and the second terminal join portions 96 may also be set as appropriate.

Second Exemplary Embodiment

Figure 7:
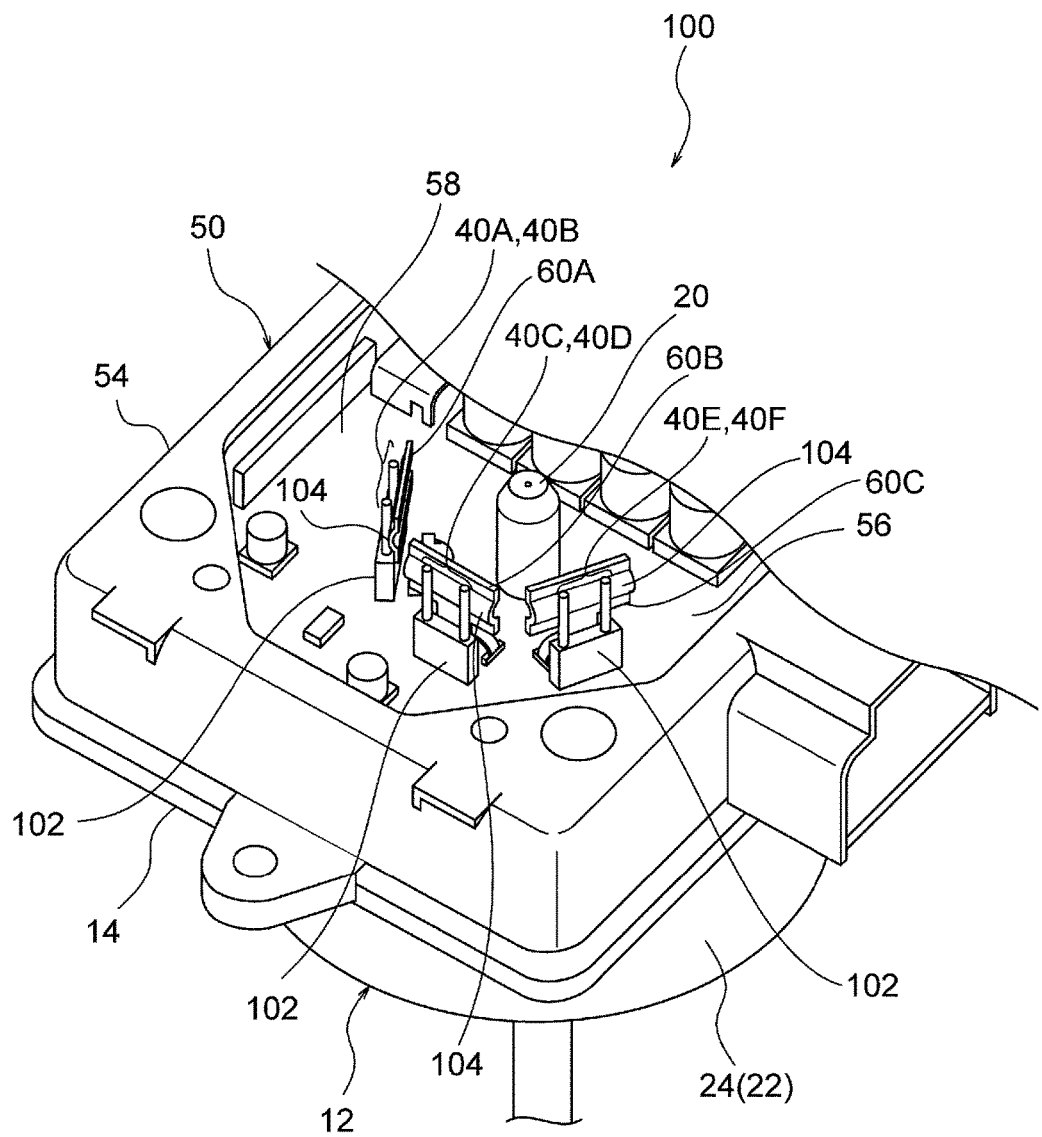
FIG. 7 is a perspective view illustrating relevant portions of a rotary electric machine according to a second exemplary embodiment.
Figure 8:
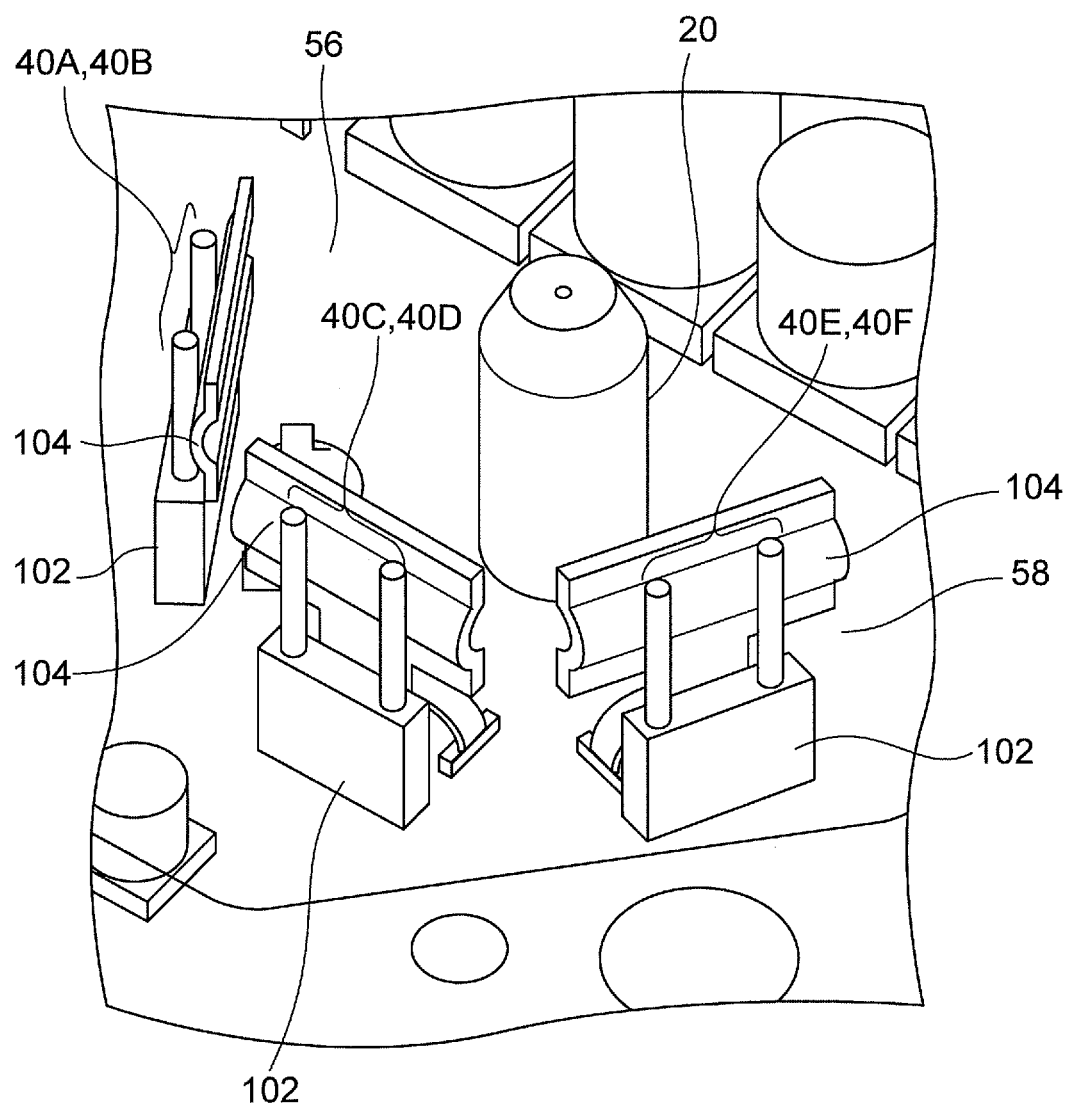
FIG. 8 is an enlarged perspective view illustrating the interior of a circuit chamber of the rotary electric machine illustrated in FIG. 7.

Explanation follows regarding a rotary electric machine 100 according to a second exemplary embodiment, with reference to FIG. 7 and FIG. 8. In the rotary electric machine 100 of the second exemplary embodiment, the connection between the wound wires 38 and the circuit terminals 60A to 60C differs from the rotary electric machine 10 of the first exemplary embodiment in the following respects.

In the rotary electric machine 100 of the second exemplary embodiment, the cover 54 is provided on the motor body 12 one axial direction side of the centerpiece 14, and the circuit chamber 56 is formed by the centerpiece 14 and the cover 54. The circuit board 58 is disposed at the motor body 12 one axial direction side. Note that in FIG. 7, a portion of a bottom wall of the cover 54 has been cut away in order to show the circuit chamber 56.

Moreover, 6 wound wire terminal portions 40A to 40F extend from the motor body 12, with the wound wire terminal portions 40A to 40F inserted through the circuit board 58 in pairs (a pair of the wound wire terminal portions 40A and 40B, a pair of the wound wire terminal portions 40C and 40D, and a pair of the wound wire terminal portions 40E and 40F). The portions of the wound wire terminal portions 40A to 40F that are inserted through the circuit board 58 are provided with guides (guide members) 102, and the wound wire terminal portions 40A to 40F project out from the circuit board 58 toward the motor body 12 one axial direction side retained by the guides 102.

Each of the pair of first terminals 70, the pair of bus bars 80 and the second terminal 90 of the first exemplary embodiment are omitted in the second exemplary embodiment. The circuit terminals 60A to 60C are formed in substantially plate shapes, with the plate thickness directions thereof disposed in directions radiating about the motor shaft 20 as center, and the circuit terminals 60A to 60C are disposed adjacent to the wound wire terminal portions 40A to 40F respectively. Circuit terminal join portions 104 are formed at motor body 12 axial direction intermediate portions of the circuit terminals 60A to 60C. The circuit terminal join portions 104 are formed with substantially circular arc shaped cross-section profiles that project toward the side of the wound wire terminal portions 40A to 40F. The circuit terminal join portions 104 of the circuit terminals 60A to 60C are joined to the wound wire terminal portions 40A to 40F using for example projecting welding. The wound wire terminal portions 40A to 40F of the wound wires 38 that are configured from a metal with a principal component of aluminum are accordingly joined to the circuit terminals 60A to 60C that are configured from a metal with a principal component of copper inside the circuit chamber 56. As a result, corrosion can be suppressed at the join sites between the wound wire terminal portions 40A to 40F at the circuit terminals 60A to 60C without for example coating the join sites with a sealing material. Similarly to in the first exemplary embodiment, good electrical continuity is accordingly enabled between the wound wires 38 and the circuit terminals 60A to 60C whilst suppressing an increase in costs, even when the wound wire 38 is configured from metal with a principal component of aluminum.

Moreover, in the second exemplary embodiment the wound wire terminal portions 40A to 40F of the wound wires 38 extend from the motor body 12 into the circuit chamber 56, and the wound wire terminal portions 40A to 40F are joined directly to the circuit terminals 60A to 60C. A low cost can be achieved for the rotary electric machine 100 since there is no need to join the wound wire 38 outside of the circuit chamber 56.

The portions of the wound wire terminal portions 40A to 40F that are inserted through the circuit board 58 are provided with the guides 102, and the wound wire terminal portions 40A to 40F are retained by the guides 102. This thereby enables the wound wire terminal portions 40A to 40F to be feed smoothly into the circuit chamber 56, enabling stable welding of the wound wire terminal portions 40A to 40F to the circuit terminal join portions 104.

Third Exemplary Embodiment

Figure 9:
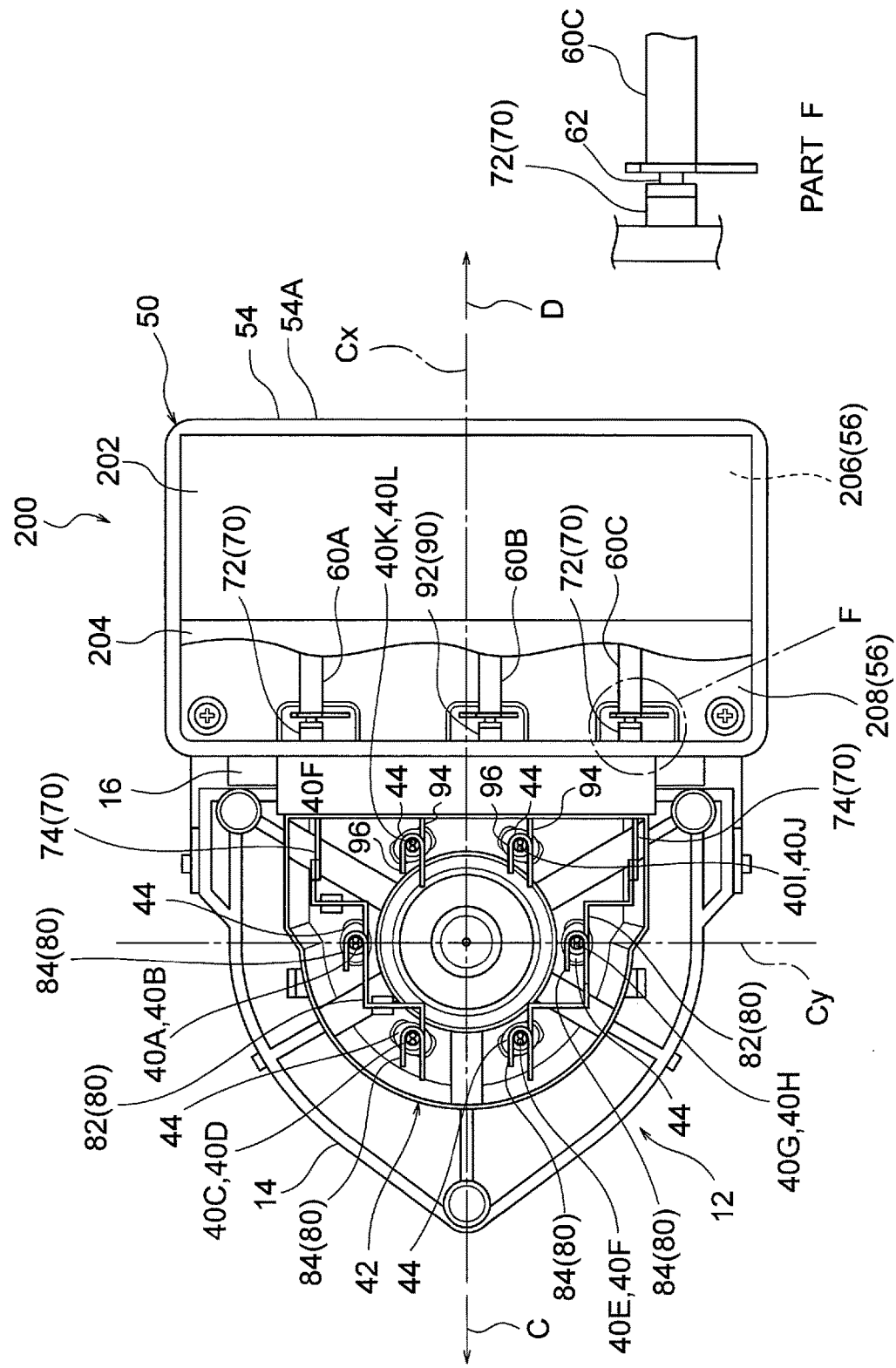
FIG. 9 is a plan view illustrating relevant portions of a rotary electric machine according to a third exemplary embodiment as viewed from one axial direction side of the rotary electric machine.
Figure 10:
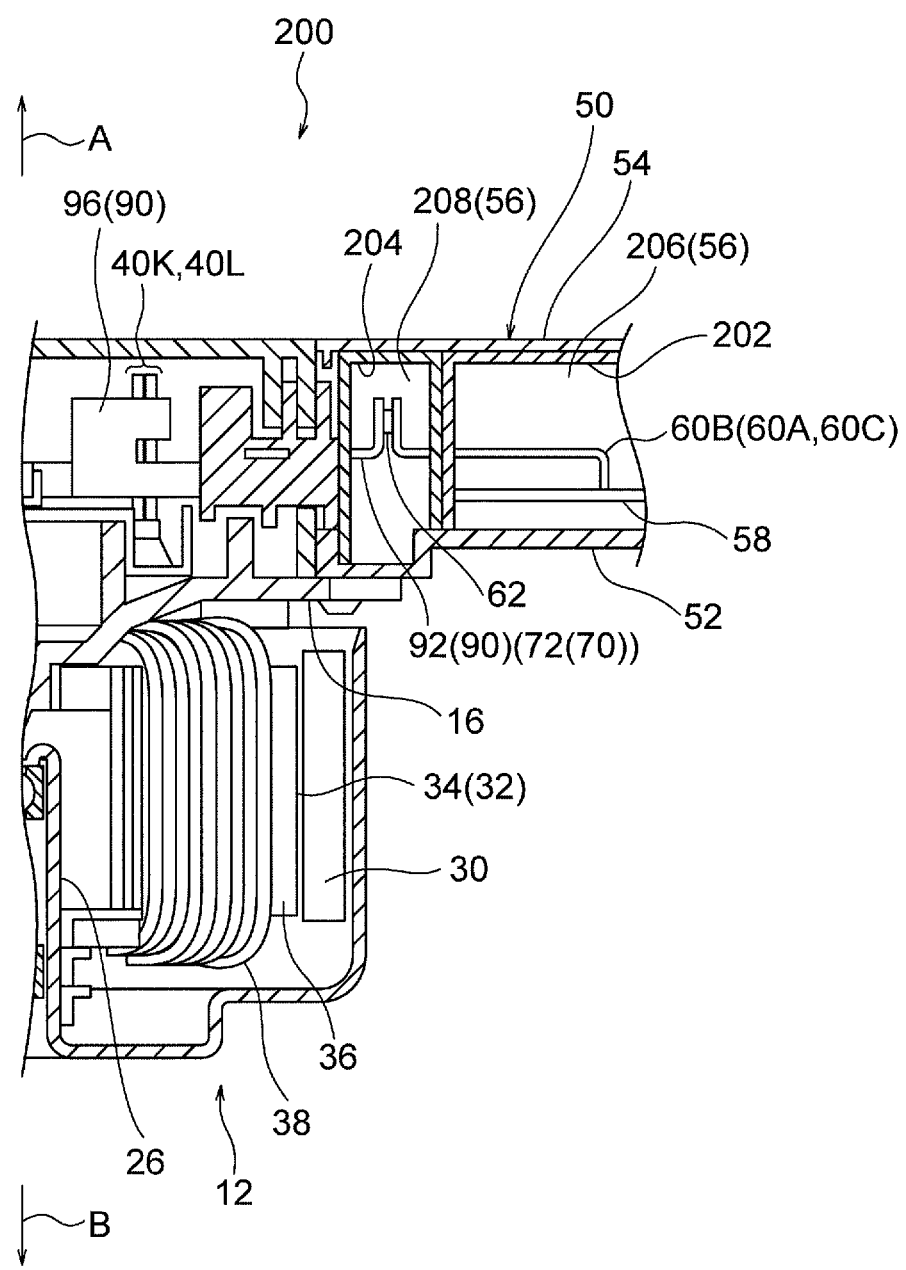
FIG. 10 is a side view cross-section illustrating a circuit chamber of the rotary electric machine illustrated in FIG. 9.

Explanation follows regarding a rotary electric machine 200 according to a third exemplary embodiment, with reference to FIG. 9 and FIG. 10. The rotary electric machine 200 of the third exemplary embodiment is configured similarly to the rotary electric machine 10 of the first exemplary embodiment with the exception of the following points.

In the third exemplary embodiment, a circuit cover 202 and a connection terminal cover 204 are provided inside the cover 54. The circuit chamber 56 is partitioned into two regions by the circuit cover 202 and the connection terminal cover 204.

The circuit cover 202 is formed in a substantially box shape open toward the base portion 52 side, and is disposed inside the circuit chamber 56 at a portion on the opposite side (on the arrow D direction side in FIG. 9) to the motor body 12. The region of the circuit chamber 56 partitioned by the circuit cover 202 configures a board housing chamber 206, and the circuit board 58 (see FIG. 10) is housed inside the board housing chamber 206.

The connection terminal cover 204 is formed in a substantially box shape open toward the base portion 52 side, and is disposed adjacent to the circuit cover 202 on the motor body 12 side (the arrow C side in FIG. 9) of the circuit cover 202. The region of the circuit chamber 56 partitioned by the connection terminal cover 204 configures a terminal join chamber 208. Note that in FIG. 9, the bottom wall of the cover 54 and a portion of a bottom wall of the connection terminal cover 204 have been omitted from illustration for ease of explanation.

The cover 54 is configured from a resin material, and the circuit cover 202 and the connection terminal cover 204 are integrally formed (insert molded) with the cover 54 at the cover 54 inside. The inside of the board housing chamber 206 and the inside of the terminal join chamber 208 are accordingly sealed, thereby securing water resistant properties of the board housing chamber 206 and the terminal join chamber 208.

The circuit terminals 60A to 60C are respectively formed in substantially elongated plate shapes, and are bent into substantially crank shapes as viewed along the orthogonal axis Cy axial direction (see FIG. 10). Length direction intermediate portions of the circuit terminals 60A to 60C are disposed with the plate thickness direction in the motor body 12 axial direction, and pass through mutually adjacent side walls of the circuit cover 202 and the connection terminal cover 204. In other words, the length direction intermediate portions of the circuit terminals 60A to 60C are disposed so as to project out from the mutually adjacent side walls of the circuit cover 202 and the connection terminal cover 204 toward the board housing chamber 206 side and the terminal join chamber 208 side. Length direction one end portions of the circuit terminals 60A to 60C are bent toward the circuit board 58 side (the arrow B direction side in FIG. 10), and are joined to the circuit board 58. Length direction other end portions of the circuit terminals 60A to 60C are bent toward the motor body 12 one axial direction side (the arrow A direction side in FIG. 10), and are disposed inside the terminal join chamber 208. The protrusion portions 62 of the circuit terminals 60A to 60C project out from the length direction other end portions of the circuit terminals 60A to 60C toward the motor body 12 side. Note that the side walls of the circuit cover 202 and the connection terminal cover 204 are formed with for example notches through which the circuit terminals 60A to 60C pass, and are sealed with for example a sealing material.

The first terminals 70 and the second terminal 90 pass through the motor body 12 side side wall of the cover 54 and the motor body 12 side side wall of the connection terminal cover 204, and respective one ends of the first terminals 70 and the second terminal 90 are disposed inside the terminal join chamber 208. Note that the first terminals 70 and the second terminal 90 are assembled to the cover 54 through the sealing material. Inside the terminal join chamber 208, the first terminals 70 are joined to the circuit terminals 60A and 60C, and the second terminal 90 is joined to the circuit terminal 60B.

Accordingly, in the third exemplary embodiment, the circuit terminals 60A to 60C that are configured from a metal (brass) with an electrical conductivity different to aluminum, and the first terminals 70 and the second terminal 90 that are configured from a metal with a principal component of aluminum are joined inside the terminal join chamber 208 for which water resistant properties are secured (are high). The third exemplary embodiment is accordingly capable of exhibiting similar operation and advantageous effects to those of the first exemplary embodiment.

Figure 11:
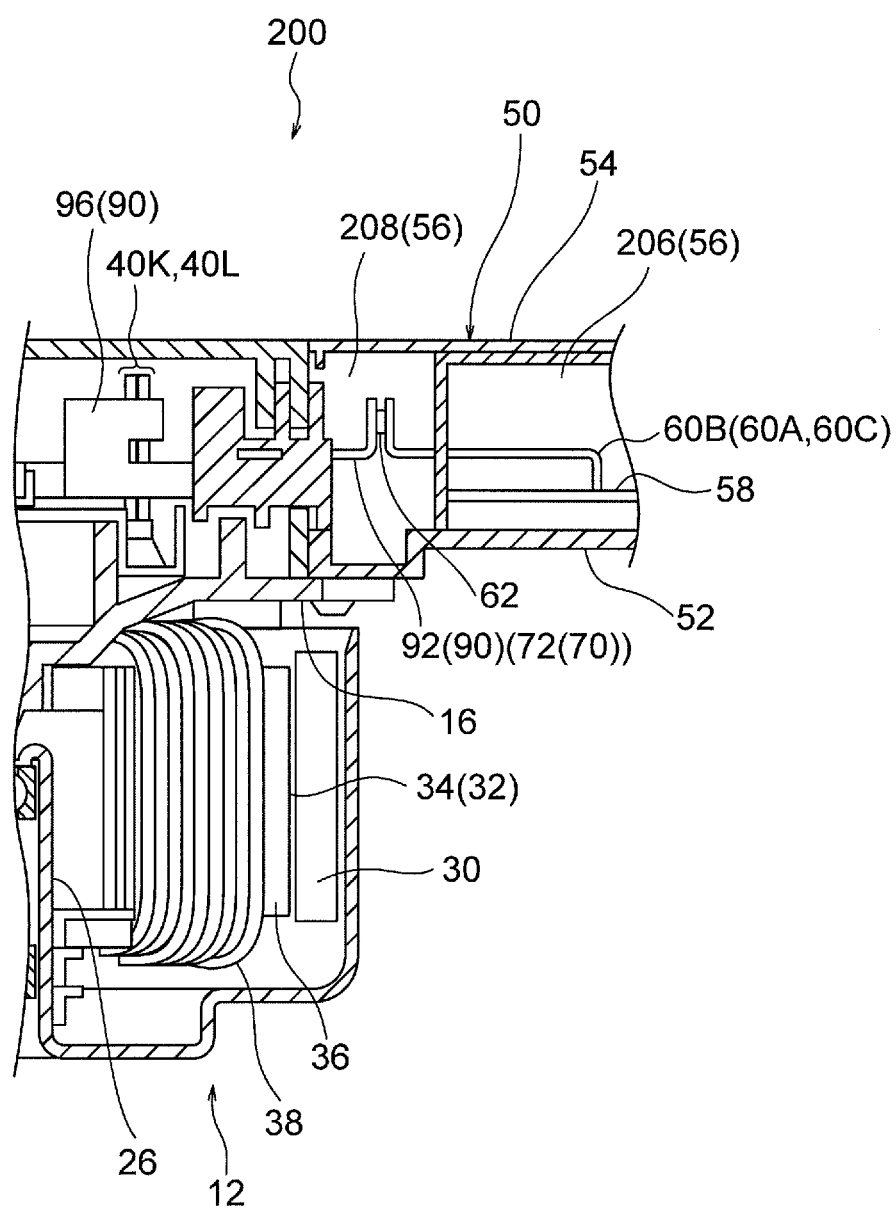
FIG. 11 is a side view cross-section illustrating another example of the circuit chamber illustrated in FIG. 10.

Note that in the third exemplary embodiment, the circuit cover 202 and the connection terminal cover 204 are integrally formed to the cover 54 inside the cover 54, and the circuit chamber 56 is partitioned into the board housing chamber 206 and the terminal join chamber 208. Alternatively, as illustrated in FIG. 11, the connection terminal cover 204 may be omitted, and the cover 54 and the circuit cover 202 integrally formed together, thereby partitioning the circuit chamber 56 into the board housing chamber 206 and the terminal join chamber 208.

The first exemplary embodiment to the third exemplary embodiment may be configured with a mazelike structure (what is referred to as a labyrinth structure) at an inner peripheral portion of the cover 54 in order to further enhance the water resistant properties of the circuit chamber 56.

What is claimed is:

1. A rotary electric machine, comprising:
a cover that configures an outline of a sealed circuit chamber;
a drive circuit section that is housed inside the circuit chamber and that drives a motor section;
a circuit terminal that is provided at the drive circuit section such that the circuit terminal is housed inside the circuit chamber, and that is configured from a conductive metal other than aluminum; and
wound wires that are wound around tooth portions of an armature core in the motor section, the wound wires being configured from a metal whose principal component is aluminum, and having terminal portions that are joined to the circuit terminal via a coupling member such that a joined portion at which the coupling member and the circuit terminal are joined is arranged inside the circuit chamber, the coupling member being configured from a metal whose principal component is aluminum, wherein:
the circuit chamber is disposed adjacent to the motor section as viewed along an axial direction of the motor section,
the coupling member includes a plurality of join portions which are respectively joined to the terminal portions of the wound wires,
a bottomed recessed portion having a wall portion is formed at an outer side of a frame portion of the cover, such that the recessed portion is open toward one side in the axial direction of the motor section, and
hole portions are respectively formed at a wall portion of the frame portion and the wall portion of the recessed portion, such that the terminal portions of the wound wires are joined to the circuit terminal via the coupling member in a state in which the coupling member is inserted in the respective hole portions.

2. The rotary electric machine of claim 1, wherein the terminal portions of the wound wires, which are in a bundled state, are joined to each of the join portions.

3. The rotary electric machine of claim 1, wherein the coupling member is formed integrally with the cover.

4. The rotary electric machine of claim 1, wherein the circuit terminal is configured from a metal whose principal component is copper, and the joined portion of the circuit terminal with the coupling member is plated with tin.

5. The rotary electric machine of claim 1, wherein the circuit terminal is provided at a circuit board which is housed inside the circuit chamber and which configures the drive circuit section.

6. The rotary electric machine of claim 1, wherein the coupling member extends from outside of the circuit chamber and the recessed portion to inside of the circuit chamber, and the terminal portions are joined to the coupling member at the outside of the circuit chamber and the recessed portion.

* * * * *